| United States Patent [19] | [11] 3,734,536 |
| Dever et al. | [45] May 22, 1973 |

[54] TOW BAR MEANS

[75] Inventors: James A. Dever, Bay Village; Harry D. Tenan; George R. Finley, both of Cleveland, all of Ohio

[73] Assignee: The Green Ball Bearing Company, Cleveland, Ohio

[22] Filed: Aug. 17, 1970

[21] Appl. No.: 64,178

[52] U.S. Cl. ................... 280/204, 280/493, 280/496
[51] Int. Cl. .............................................. B62k 27/12
[58] Field of Search ....................... 280/204, 63, 496, 280/493

[56] References Cited

UNITED STATES PATENTS

| 3,227,467 | 1/1966 | Fugitt, Sr. | 280/204 X |
| 2,612,388 | 9/1952 | McNeill et al. | 280/204 X |
| 3,347,559 | 10/1967 | Robinson | 280/204 |
| 2,580,112 | 12/1951 | Marchetti | 280/204 |
| 2,370,988 | 3/1945 | Neal | 280/204 X |
| 2,468,894 | 5/1949 | Peek | 280/204 |
| D149,193 | 4/1948 | Larralde | 280/204 X |
| 2,515,564 | 7/1950 | Mercer et al. | 280/495 X |
| 2,747,892 | 5/1956 | Jones | 280/495 X |

FOREIGN PATENTS OR APPLICATIONS

| 76,574 | 4/1948 | Czechoslovakia | 280/204 |
| 980,513 | 5/1951 | France | 280/204 |
| 22,157 | 5/1903 | Great Britain | 280/204 |
| 837,476 | 2/1939 | France | 280/204 |

*Primary Examiner*—Leo Friaglia
*Assistant Examiner*—John P. Silverstrim
*Attorney*—J. H. Slough

[57] ABSTRACT

A formed tow bar for trailering utility carts behind two-wheel cycles adapted to be operatively attached to the lowermost cycle frame member disposed below the axis of the wheels and forward of the rear cycle wheel and further adapted to be secured to the utility trailer whereby the formed two-bar is maintained substantially horizontal to the ground during trailering.

5 Claims, 12 Drawing Figures

PATENTED MAY 22 1973 3,734,536
SHEET 1 OF 2
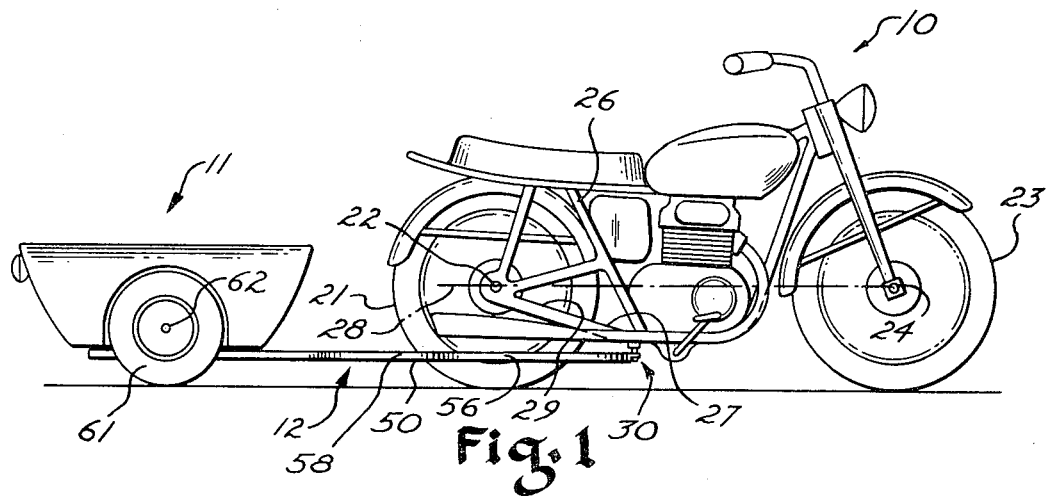
Fig. 1
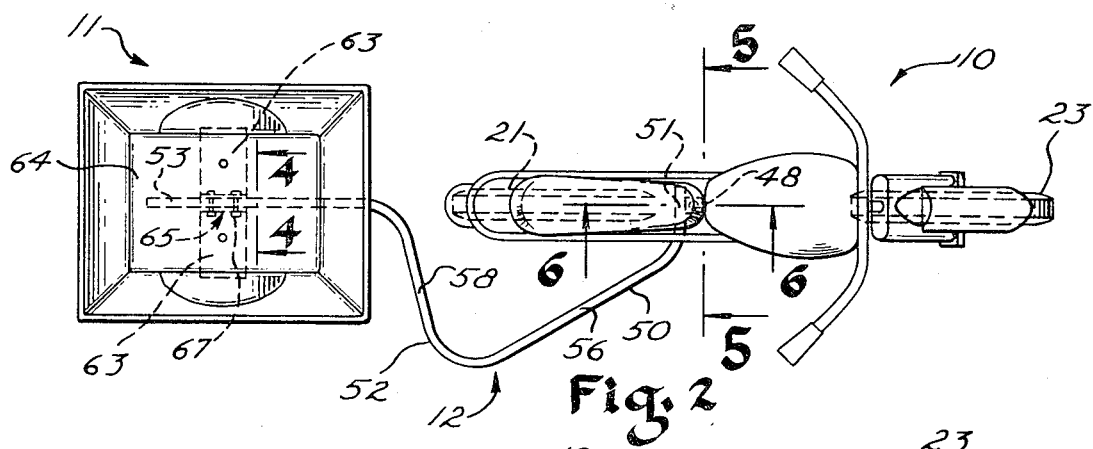
Fig. 2
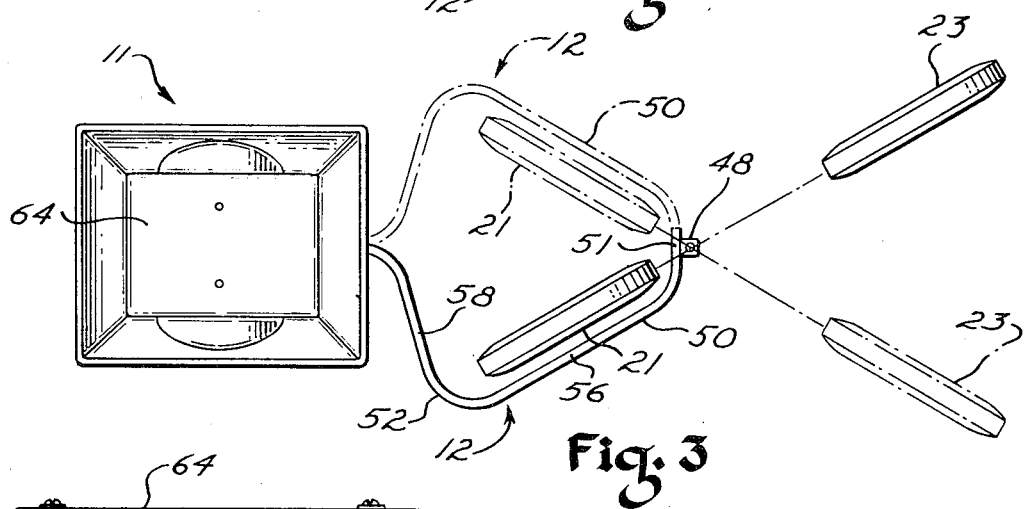
Fig. 3
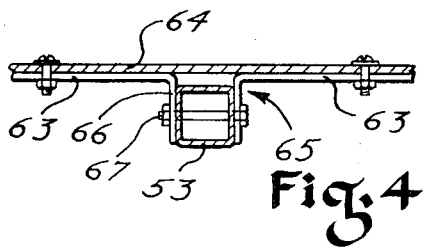
Fig. 4
INVENTORS
JAMES A. DEVER
HARRY D. TENAN
GEORGE R. FINLEY
BY 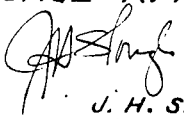
J. H. SLOUGH
ATTORNEY

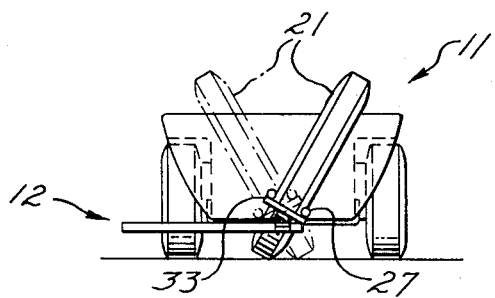
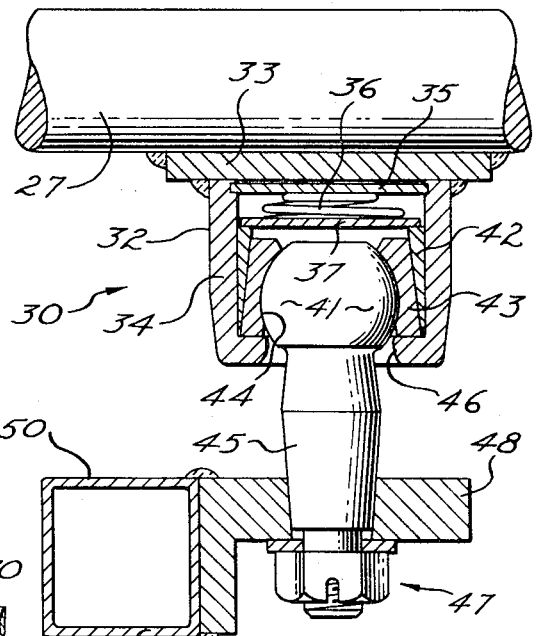
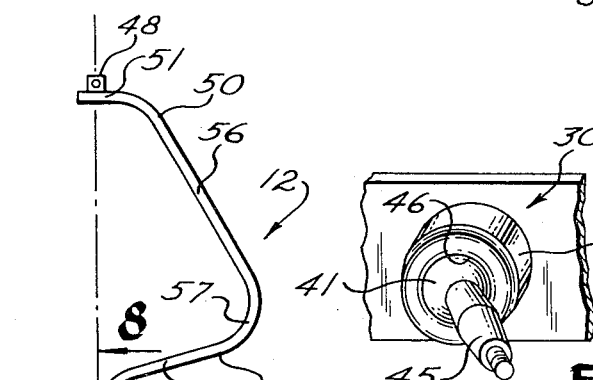
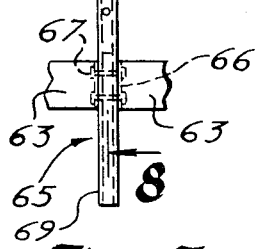
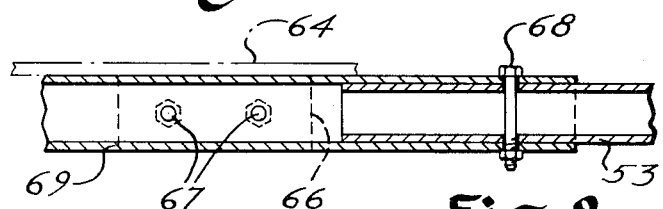
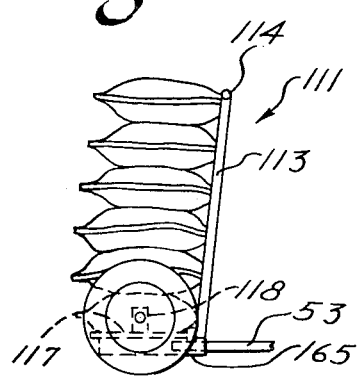
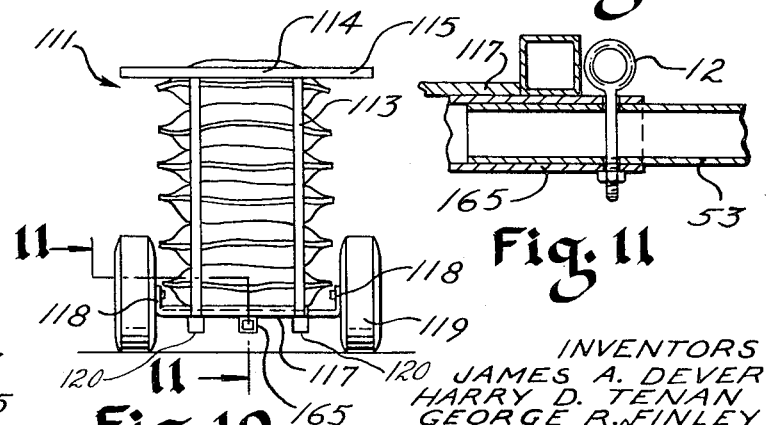

TOW BAR MEANS

Our invention pertains to a tow bar means for pulling utility trailers behind a two-wheel vehicle such as motorcycles, motor scooters, mini-bikes, bicycles, and like two-wheel cycles.

Various types of motorized cycles are widely utilized to provide a rapid means of transportation due to their maneuverability, ease in handling, and ability to travel in tight places. Motorized cycles have been adapted to pull utility trailers or carts of various types by providing a wide variety of tow bar means for hitching the trailer to the cycle. However, tow bars heretofore suggested provide only limited utility primarily due to inherent dangers in operating a two-wheel vehicle. These hazards are unduly multiplied by merely connecting a trailer on the rear end of the cycle wherein loads carried within the trailer often exert various sidewise forces tending to upset the stability and balance of the cycle. As well known to cycle riders, two-wheel vehicles do not remain vertically normal to the ground in use, but rather, tend to bank or tilt from the vertical when negotiating a turn. Unexpected shifts in the forces exerted on the cycle by the trailer tend to cause the trailer and rearward portion of the cycle to jackknife about the pivotal point of the forward wheel of the cycle. Further, hazards exist with cycles upon stopping wherein the rearwardly drive wheel of the cycle tends to slide sideways and once again jackknife the vehicle and trailer about the pivotally operative forward wheel of the cycle. Ordinarily, increased loads in the trailer increase the danger of upsetting the cycle merely due to the momentum of the load being trailered. Hence, vehicle speeds and/or load weights are restricted due to the inherent hazards of trailering a load behind a two-wheel cycle.

It is therefore desirable to provide an improved cycle tow bar means for securing a utility trailer to a cycle so as to minimize the numerous inherent safety problems, and yet, substantially increase the potential weight load that may be trailered wherein heavy loads can be handled and maneuvered with considerable ease.

SUMMARY

In accordance with the present invention, a cycle tow bar means is provided by which a utility trailer is secured to a two-wheeled vehicle, the tow bar having a forward hitching portion adapted to be operatively secured to a lower frame member of the cycle at a point disposed between the forward and rear wheels of the cycle and at a point below the axis of the wheels. The formed tow bar further includes a rearward hitching portion in-line with the forward hitching portion for advantageously minimizing the non-balancing effects of the trailered load.

Accordingly, it is a principal object of this invention to provide a tow bar means particularly adapted for use with two-wheel vehicles for pulling trailers and advantageously providing substantial stability to the cycle and trailer.

A further object is to provide a sturdy and yet lightweight tow bar means simple in construction and economical to manufacture.

A still further object is to provide a heavy-duty tow bar means for two-wheel cycles suitable for trailering substantially heavy loads with ease and with minimal effect of the weight.

A further object of this invention is to provide multipurpose utility vehicles having tow bar means particularly adapted to trailer behind a cycle and provided with detachable coupling means for converting the utility vehicle into a hauling cart for use on construction sites.

Another object is to provide a formed tubular tow bar means easy to handle and adapted to be quickly attached or detached in use.

Yet another object is to provide a tow bar means for providing unlimited maneuverability and substantial stability to the two-wheel vehicle while traveling.

A further object of this invention is to provide a tow bar means adapted to freely enable a two-wheel vehicle to maneuver while turning corners or making banked turns.

A further object of this invention is to provide a tow bar means for trailers adapted to increase the stability of two-wheel vehicles while braking or stopping the cycle.

A still further object of this invention is to provide a formed tow bar means adapted to balance and tow the load in a utility vehicle in-line with the frame of the cycle pulling the utility trailer.

Yet another object is to provide a horizontally disposed tow bar means for cycles towing trailers adapted to be operatively secured to said cycle so as provide maximum stability to the cycle and trailer in use while making banked turns and quick stops.

These and other objects and advantages of this invention become more apparent from the following detailed description thereof and the accompanying drawings, in which said drawings:

FIG. 1 is a side elevation view of a typical motorcycle and utility trailer having a tow bar means operatively secured therebetween;

FIG. 2 is a top plan view of the cycle and utility trailer shown as FIG. 1;

FIG. 3 is a simplified top plan view illustrating lateral movement of the rear wheel of the cycle relative to the tow bar means and further illustrating in phantom lines that the formed tow bar means may be utilized on the other side of the cycle;

FIG. 4 is an enlarged transverse section taken along line 4—4 of FIG. 2 showing the tubular tow bar secured within a coupling means provided below the floor of the utility trailer;

FIG. 5 is an enlarged simplified view taken along line 5—5 of FIG. 2 illustrating vertical maneuverability of the rear wheel of the cycle relative to the tow bar and utility vehicle being trailered;

FIG. 6 is an enlarged section view taken along line 6—6 of FIG. 2 illustrating the ball joint means for operatively interconnecting the tow bar means to a lower frame member of the cycle;

FIG. 6a is a simplified perspective of the ball joint means looking upwardly as viewed in FIG. 1 and with the cycle frame and tow bar removed;

FIG. 7 is a view of the tow bar secured to coupling means provided on the lower portion of the utility trailer with the utility trailer removed;

FIG. 8 is an enlarged section view taken along line 8—8 of FIG. 7 showing the tubular tow bar interconnection with the tubular coupling means;

FIG. 9 illustrates a multipurpose utility vehicle suitable for transporting cement bags on a construction site and adapted to be trailered behind a two-wheel cycle;

FIG. 10 is a front elevation view of the multipurpose utility vehicle shown in FIG. 9 adapted to be readily connected or disconnected for use on a construction job site.

FIG. 11 is an enlarged section view taken along line 11—11 in FIG. 10 illustrating quick-disconnect means.

Referring now to the drawings wherein like parts are identified by like reference characters, a two-wheel cycle 10 is illustrated pulling a utility vehicle or cart 11 and having a two bar means 12 operatively interconnected therebetween. The cycle 10 includes a rear wheel 21 and a forward wheel 23 each operatively secured in the usual manner to the respective axle means, rear axle 22 and forward axle 24. The wheels 21, 23 are operatively attached to the cycle frame generally indicated at 26, and the lowermost frame member 27 as shown is preferably disposed below the axis 28 of axle means 22 and 24.

As best illustrated in FIG. 6 the tow bar means 12 having an operative universal ball joint means 30 is operatively interconnected to the lower frame member 27 forwardly of the rear cycle wheel 21. The lowermost frame member 27, as shown in FIG. 1, is provided with a rearwardly and upwardly disposed fork member 29 accommodating the rear wheel 21 therebetween, the forked portion 29 terminating in an operative connection with the axle of the rear wheel 21. Although the forked portion 29 as shown extends forwardly of the rear wheel 21 into a single frame member 27, the forked portion 29 may alternatively extend forwardly into a dual frame member (not shown) forwardly of the rear wheel 21. Hence, the lowermost frame member 27 or alternatively dual members extending forward of the rear wheel 21, as described, are secured to the ball joint means 30 substantially in the same vertical plane as the rear and front wheels 21, 23 thus providing maximum stability to the cycle 10.

Referring further to FIG. 6, the ball joint means 30 secured to the frame member 27 includes a housing 32, said housing having a rear wall 33 secured to frame member 27 and side walls 34, 34. Secured within the housing 32 proximate to the rear housing wall 33 is a spring 36 and interposed between a pair of spaced pressure plates 35, 37. Wedge members 42 are also shown disposed adjacent to housing side walls 34,34 in compressive engagement therewith and in further compressive engagement with ball joint side walls 43, 43. Accordingly, the spring member 36 maintains an expansion force on the pressure plate 37 providing compressive engagement of the wedge members 42 with the housing side walls 34, 34 and ball joint side walls 43,43 thereby maintaining secure operative engagement of the ball joint socket with a ball member 41. The side walls 43, 43 have concave rounded inner wall surfaces 44 in engagement with the ball member 41 whereby the spring 36 and wedge members 42 cooperate to maintain the ball member in tight engagement within the socket. The stem 45 for the ball 41 and socket member protrudes through an opening 46 provided within the housing 32 and is secured outside the housing 32 as illustrated to a right angle coupling means 48 by threaded tap bolt means 47. The universal ball joint means 30 secured to the lowermost cycle frame member 27 is disposed below said frame member 27 and the stem 45 extends downwardly therefrom. The ball and socket member is thus disposed below the cycle frame member 27 and substantially in the same vertical plane as the cycle frame 76. Referring now to FIG. 6a, the ball joint means is viewed looking upwards wherein the stem 45 is shown rotatively journalled within an opening 46 of the housing 32 and universal operative movement of the stem member 45 within the periphery of the opening 46 is permitted whereby the stem member 45 is permitted a range of movement sufficient to accommodate rotative movement of the ball member 41 within the housing 32 while trailering. The coupling member 48 attached to the stem member 45 is secured to a formed tow bar 50 for towing the utility trailer 11. The ball joint means 30, therefore, provided operative attachment of the tow bar means 12 to the cycle for towing and further permits the tow bar 50 to remain substantially horizontal to the ground while traveling straight away, traveling inclines, rough terrain, and negotiating banked turns.

The formed tow bar 50 of the invention may be advantageously constructed of metal box tubing and comprises a plurality of formed portions including a forwardly disposed hitching portion 51 for attachment of the cycle 10 forward of the rear cycle wheel and for operative attachment to the lower frame member 27 thereof below the axis 28 of the cycle wheels. The forward hitching portion 51 extends rearwardly into a laterally offset medial portion 52 and extends further into a rearward hitching portion 53 disposed substantially in-line with forward hitching portion 51 as shown in FIG. 7. Accordingly, operative coupling of the hitching means 51 with the ball joint means 30 locates the rearwardly disposed hitching portion 53 substantially in-line with the ball joint means 30 and substantially in-line with the lower frame member 27 of the cycle 10. The lateral offset medial portion 52 of the tow bar 50 comprises a rearwardly angled substantially straight portion 56, a substantially right angle portion 57, and a transversely disposed rearward portion 58 whereby the formed bowed portion advantageously accommodates lateral movement of the rear wheel 21 of the cycle 10, as shown in FIG. 3.

Referring now to FIGS. 1–8, shown is a conventional utility cart 11 having the cargo carrying portion 60 disposed over spaced wheels 61, 61 operatively interconnected by an axle means 62 in the usual manner. Rectangular plate members 63, 63 secured to the underside surface of the floor member 64 of the cart 11 as shown in dotted lines in FIG. 2. The rectangular spaced plate members 63,63 have downwardly depending flange portions 66,66 forming an elongated coupling means 65 disposed midway between spaced wheels 61, 61 extending forwardly and rearwardly of the trailer means 60. The elongated coupling means 65 is adapted to engage the rearward hitching portion 53 of the formed tow bar 50 and be secured thereto by a plurality of through-bolt means such as bolts 67, 67. A modification of the elongated coupling means 65 is shown in FIG. 7 wherein an elongated tubular member 69 is secured to the spaced depending flanges 66, 66 by bolts 67, 67. The elongated rearward hitching portion 53 of the tow bar 50 is secured within the tubular elongated member 69 by a quick disconnect means 68. As viewed in FIG. 8, the elongated rearward hitching portion 53 of the tow bar 50 extends within the coupling means 69 beyond the disconnection means 68 thereby further providing secure attachment. Hence, the elongated coupling means 65 suitably secured to the rearwardly disposed hitching portion 53 of the tow bar 50 thereby maintains the tow bar 50 substantially horizontal to the ground in use. The elongated coupling means 65 further advantageously locates the trailer load in-line with the universal ball joint means 30 which, in use, is disposed forward of the rear cycle wheel 21 and operatively secured to the lowermost frame member 57 of the cycle 10.

Referring now to FIGS. 9–11, illustrated therein is a multiple-use utility trailer 111 particularly adapted for hauling heavy loads such as sand bags, cement bags and like building materials often handled on construction sites. The multiple-use trailer 111 is adapted to be quickly converted from a utility cart into a two-wheel hand truck for use on construction sites. Provided is a detachable coupling means such as a through eye-bolt 112. The load carrying portion of the multipurpose vehicle 111 comprises a pair of cylindrical vertical members 113, 113, secured to a load bearing platform 117 having a pair of spaced horizontal support members 120, 120 secured to the lower surface thereof to provide structural support to the platform 117. An upper disposed cross member 114 is secured to the upper portion of the vertical members 113, 113 and extends laterally therefrom forming handgrips 115, 115 for use as a two-wheel hand truck. The load bearing platform 117 is provided with laterally spaced upwardly extending angle members 118 adapted to be operatively secured to spaced wheels 119, 119. Disposed between the spaced support members 120, 120 and located substantially midway between the wheels 119, 119 is an elongated coupling means 165 secured to the underside of the platform 117 and adapted to engage the rearward hitching portion 53 of the tow bar 50. The elongated coupling means 165 may be box-like and tubular so as to receive a similar shaped rearward hitching portion 53 of the tow bar 50 and is adapted for quick disconnection by removing the eye-bolt 112 as illustrated in FIG. 11. The elongated coupling means 165 is securely attached to the rearward hitching portion 53 of the tow bar 50 and advantageously maintains the tow bar 50 substantially horizontal to the ground while negotiating banked turns, traveling inclines, traveling rough terrain and effecting stops. The load in the multiple-use trailer 111 is trailered and balanced substantially in-line with the forward hitching portion 51 and ball joint means 30 thereby maintaining the load in-line with the cycle frame 10.

In use, the formed tubular tow bar is maintained substantially horizontal to the ground as viewed in FIG. 1 wherein the cycle and utility cart stand normal to the ground. The tow bar means is operatively interconnected to the cycle frame at a point disposed substantially below the axis of the front and rear axles of the cycle. For example, locating the horizontally disposed tow bar approximately four inches from the ground has been found to be advantageous. The operative universal ball joint interconnection with the cycle is disposed forward of the rear cycle wheel and in-line with the cycle frame. The formed tow bar is secured to the utility vehicle at a position approximately midway between the tires and below their axis and approximately midway between the distal sides of the load bearing floor or plate of the utility vehicle. Preferably, the tow bar 50 is secured to the trailer below the cargo carrying portion of the utility trailer, and yet, maintained substantially horizontal to the ground thereby providing maximum stability to the load. Locating the tow bar horizontal in conjunction with the operative interconnection forward of the rear cycle wheel and below its axis further stabilizes the cycle upon effecting quick stops.

Accordingly, utility and multiple-use carts trailered behind two-wheel cycles are substantially stabilized and advantageously balanced by providing a formed tow bar means particularly adapted to be operatively interconnected to the lowest frame member of the cycle wherein the operative interconnection is disposed forward of the rear cycle wheel. The horizontally disposed formed tow bar means having its forward and rearward hitching means in-line provides inherent stability to the cycle and trailer while negotiating banked turns, traveling inclines, traveling rough terrains and effecting quick stops. The in-line hitching portions being disposed horizontally in use permits heavy cargoes to be trailered without upsetting the cycle and further provides substantial maneuverability to the cycle. Locating the operative universal ball joint interconnection on a portion of the cycle frame member forward of the rear cycle wheel and below the axis of the wheels further advantageously provides stability to the cycle and trailer by reason that forward momentum forces from heavy cargoes are centered approximately vertically below the cycle rider and below the axis of the rear and forward wheels of the cycle. Hence, substantial inherent safety is provided in addition to permitting unlimited maneuverability of the cycle while trailering a utility vehicle behind the cycle.

Although specific embodiments have been hereinbefore described in detail, it is understood that the subject invention is not limited thereto and all obvious variations and modifications thereof are contemplated and are included within the spirit and scope of the invention as defined in the appended claims.

We claim:

1. A utility trailer adapted to be towed behind a two-wheel cycle having a lower frame member disposed forwardly of the rear cycle wheel and below the level of the rear cycle wheel axis, said trailer comprising: a load support portion having a pair of laterally spaced wheels; tow bar means secured to said trailer midway between said spaced wheels for connecting the trailer to the cycle; said tow bar means comprising a forward hitching means, a laterally offset medial portion, and a rearward hitching portion, all disposed substantially in the same plane; said rearward hitching portion including an elongated member located substantially in-line with said forward hitching means and connected to the fore-and-aft center line of the utility trailer; said elongated member securely attached to said trailer whereby said formed tow bar is maintained substantially horizontal and in-line during trailering; said forward hitching means disposed forwardly of the rear cycle wheel and adapted to be operatively mounted to said cycle lower frame member; said forward hitching means including universal movement means; whereby the cycle may be turned and banked while the tow bar means is maintained substantially horizontal to the ground and the trailer is maintained substantially in-line with operative connection to the cycle.

2. The utility trailer set forth in claim 1 wherein said offset medial portion includes a rearwardly angled substantially straight portion extending into a substantially right angle portion; and said right angle portion extending into a transversely disposed rearward portion.

3. The utility trailer set forth in claim 1 wherein the elongated rearward hitching portion includes means for detachably coupling the tow bar to the utility trailer.

4. The utility trailer of claim 1 wherein the trailer includes a vertical means secured to said load bearing platform; handle members secured to said vertical means; and said elongated rearward portion of the tow bar including means for detachably coupling the tow bar to the trailer whereby the utility trailer may be easily detached and converted into a two-wheel truck.

5. A utility trailer as set forth in claim 1: said means connecting said rear hitching portion to said trailer comprising a detachable coupling; said detachable coupling comprising a tubular member rigidly fixed to said trailer along said fore-and-aft center line; said rear hitching portion comprising an elongated part adapted to be telescoped into said tubular member; and means detachably retaining said elongated part in said tubular member.

* * * * *